Figure 1:
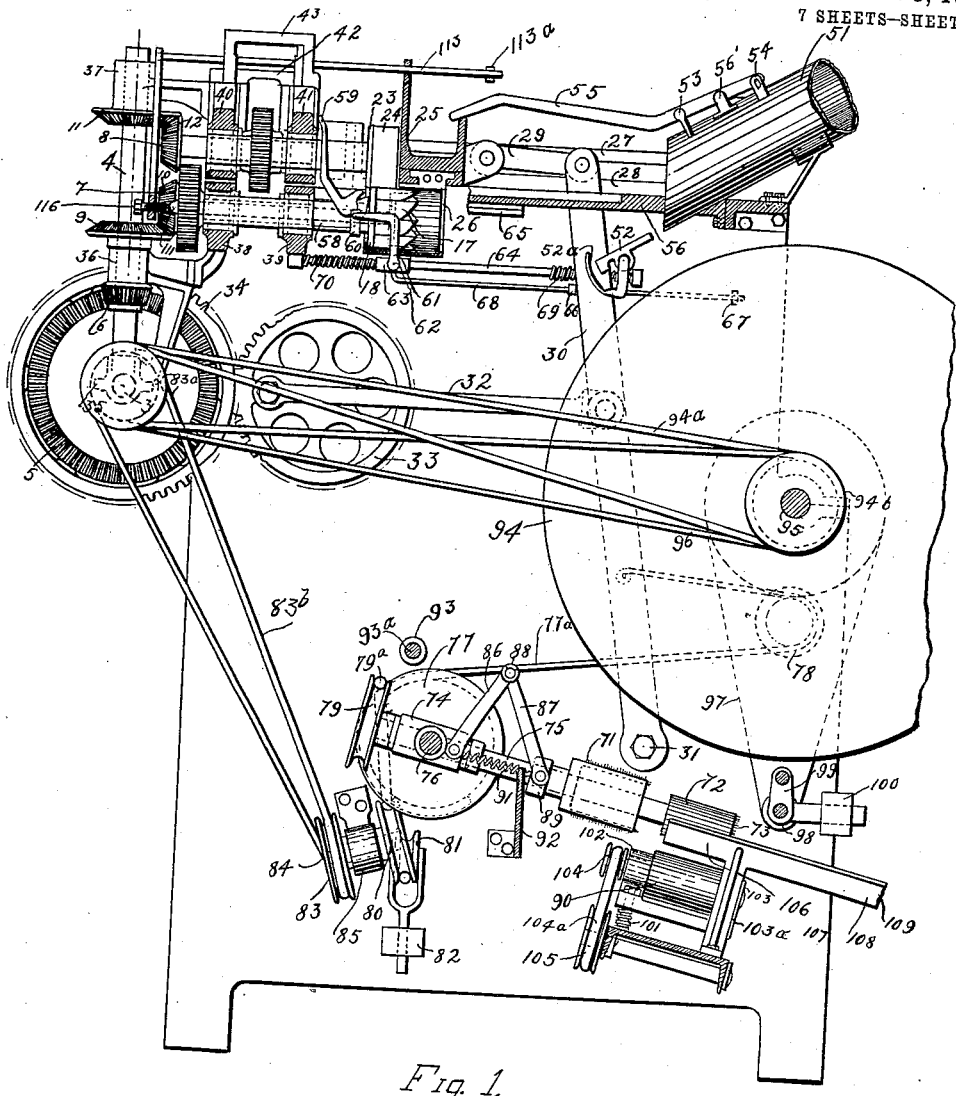

C. COSBY.
MACHINE FOR RENEWING OLD CANS.
APPLICATION FILED MAR. 27, 1911. RENEWED JULY 9, 1913.

1,085,890.

Patented Feb. 3, 1914.
7 SHEETS—SHEET 1.

Witnesses
M. F. Pollard.
H. W. Coghill

Inventor
Clarence Cosby.

C. COSBY.
MACHINE FOR RENEWING OLD CANS.
APPLICATION FILED MAR. 27, 1911. RENEWED JULY 9, 1913.

1,085,890.

Patented Feb. 3, 1914.
7 SHEETS—SHEET 2.

C. COSBY.
MACHINE FOR RENEWING OLD CANS.
APPLICATION FILED MAR. 27, 1911. RENEWED JULY 9, 1913.

1,085,890.

Patented Feb. 3, 1914.

7 SHEETS—SHEET 3.

Witnesses
M. J. Pollard
H. W. Coghill

Inventor
Clarence Cosby

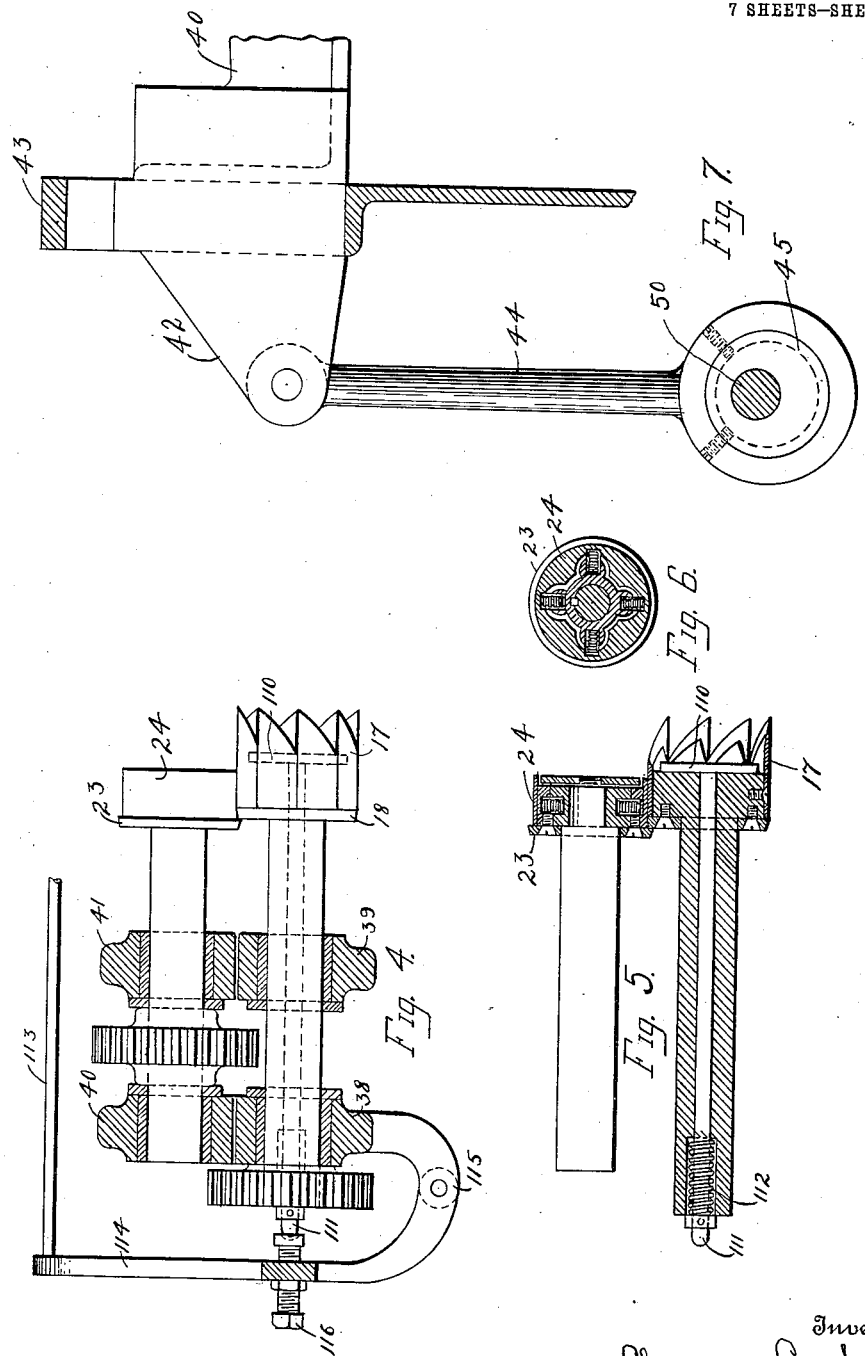

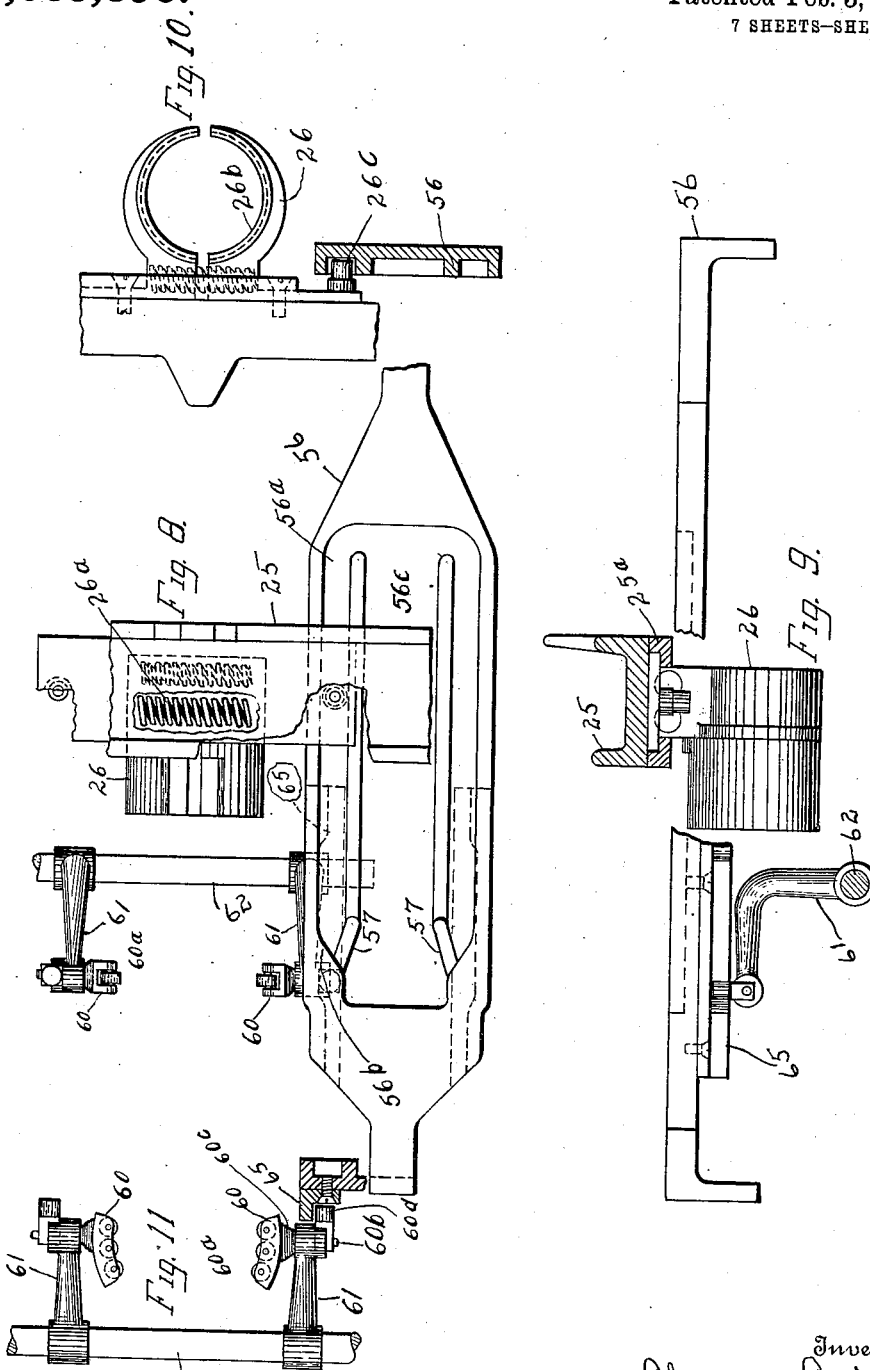

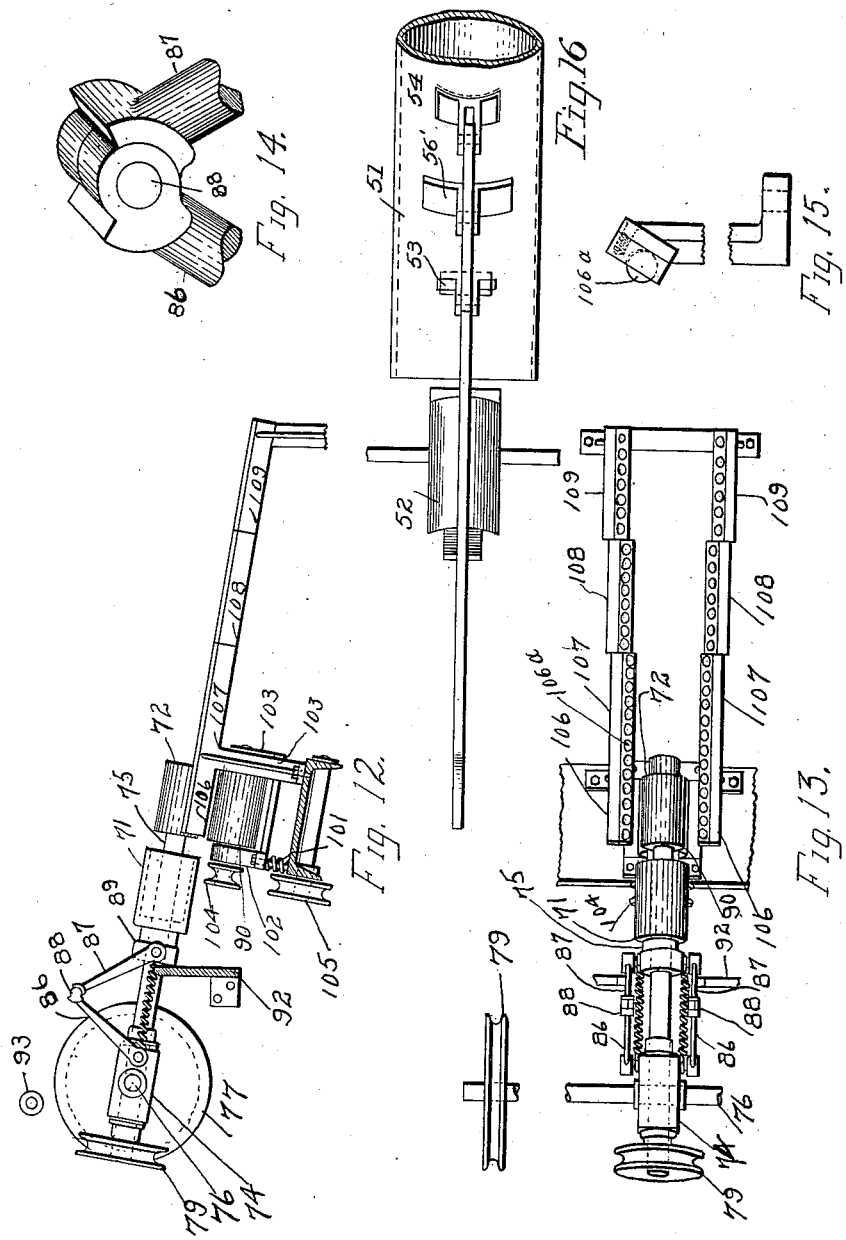

C. COSBY.
MACHINE FOR RENEWING OLD CANS.
APPLICATION FILED MAR. 27, 1911. RENEWED JULY 9, 1913.

1,085,890.  Patented Feb. 3, 1914.
7 SHEETS—SHEET 7.

Witnesses
M. F. Pollard
H. D. Coghill

Inventor
Clarence Cosby

UNITED STATES PATENT OFFICE.

CLARENCE COSBY, OF RICHMOND, VIRGINIA.

MACHINE FOR RENEWING OLD CANS.

1,085,890. Specification of Letters Patent. Patented Feb. 3, 1914.

Application filed March 27, 1911, Serial No. 617,307. Renewed July 9, 1913. Serial No. 778,175.

*To all whom it may concern:*

Be it known that I, CLARENCE COSBY, a citizen of the United States, residing at Richmond, in the county of Henrico and State of Virginia, have invented certain new and useful Improvements in Machines for Renewing Old Cans, of which the following is a specification.

This invention relates to machines for recovering cans.

It is not known to me that any machines have been provided for treating old tin cans in such manner as to utilize them for further use as cans or containing vessels. Used tin cans are ordinarily treated as scrap, and although it is old to treat such scrap for the recovery of valuable metal therefrom, and to mold the same or the residue into sash weights and the like, there is nevertheless a large loss which might be saved by treating the cans so that they are valuable for further use as containing vessels of the same type.

It will be apprehended that the recovery, in kind, of old cans, is attended with many difficulties, inasmuch as such cans are usually collected from trash, dumps and the like, and are usually in damaged condition, having particularly a top partly detached or cut out, and more or less dented and dirty. In order to utilize the cans for further service, it is therefore necessary that they be cleaned, reformed or straightened, and it is practically essential that the old tops be cut off, leaving the shell and bottom, which are usually intact, for further service. For instance, such shell or bottom may be used to contain cheap stuff, such as axle grease, powdered material of various kinds, and various other materials which can as well be placed in old cans as new cans; and for such use, the recovered bodies may be provided with covers of the ordinary slip type or other type, to fit the same.

The object of this invention is therefore to provide a machine by which old cans may be saved, in part at least, and put in such shape as to be capable of further industrial uses.

The machine embodies means for shearing off the top of the can, for removing the dents, if any, and for cleaning the can both inside and outside.

Figure 2:
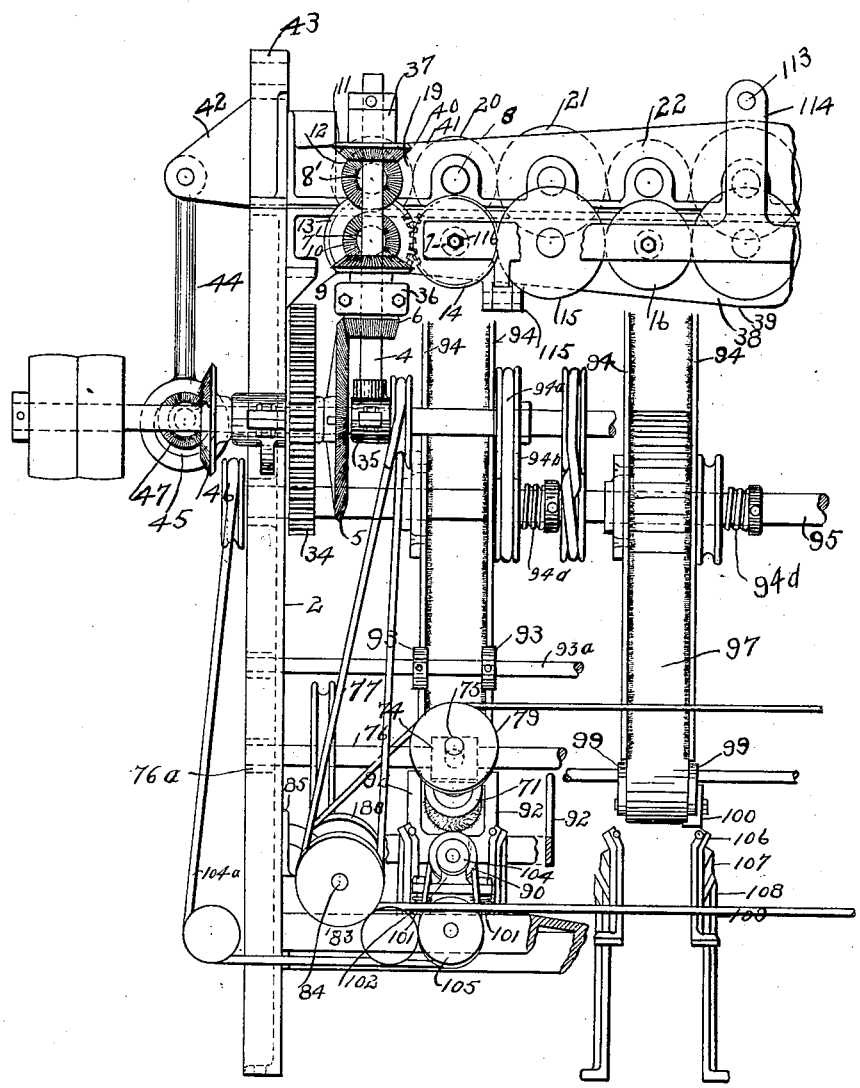
Figure 3:
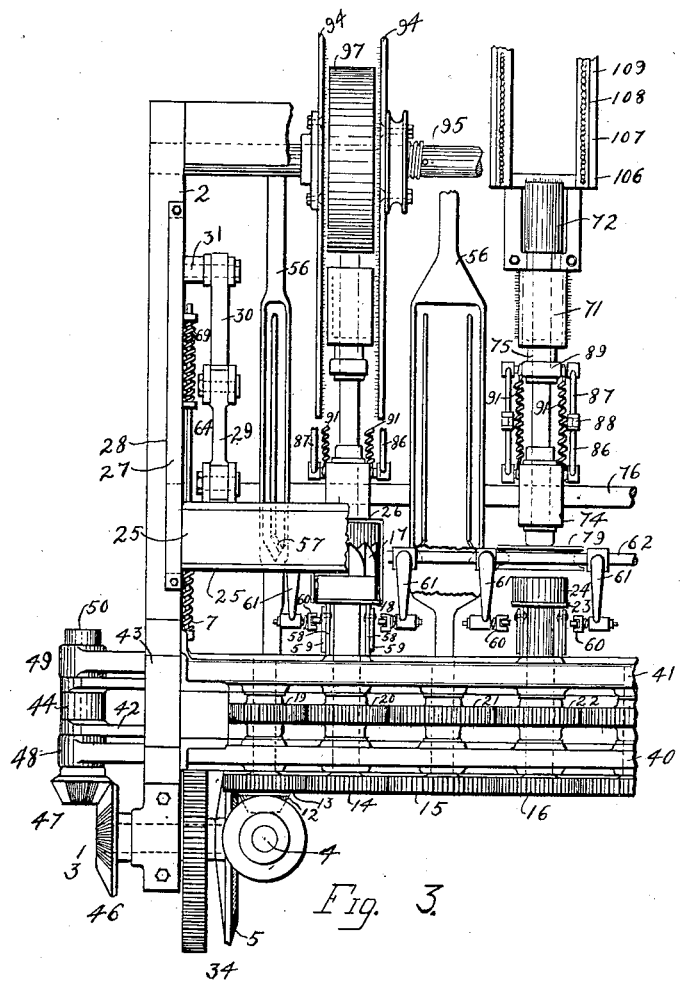
Figure 18:
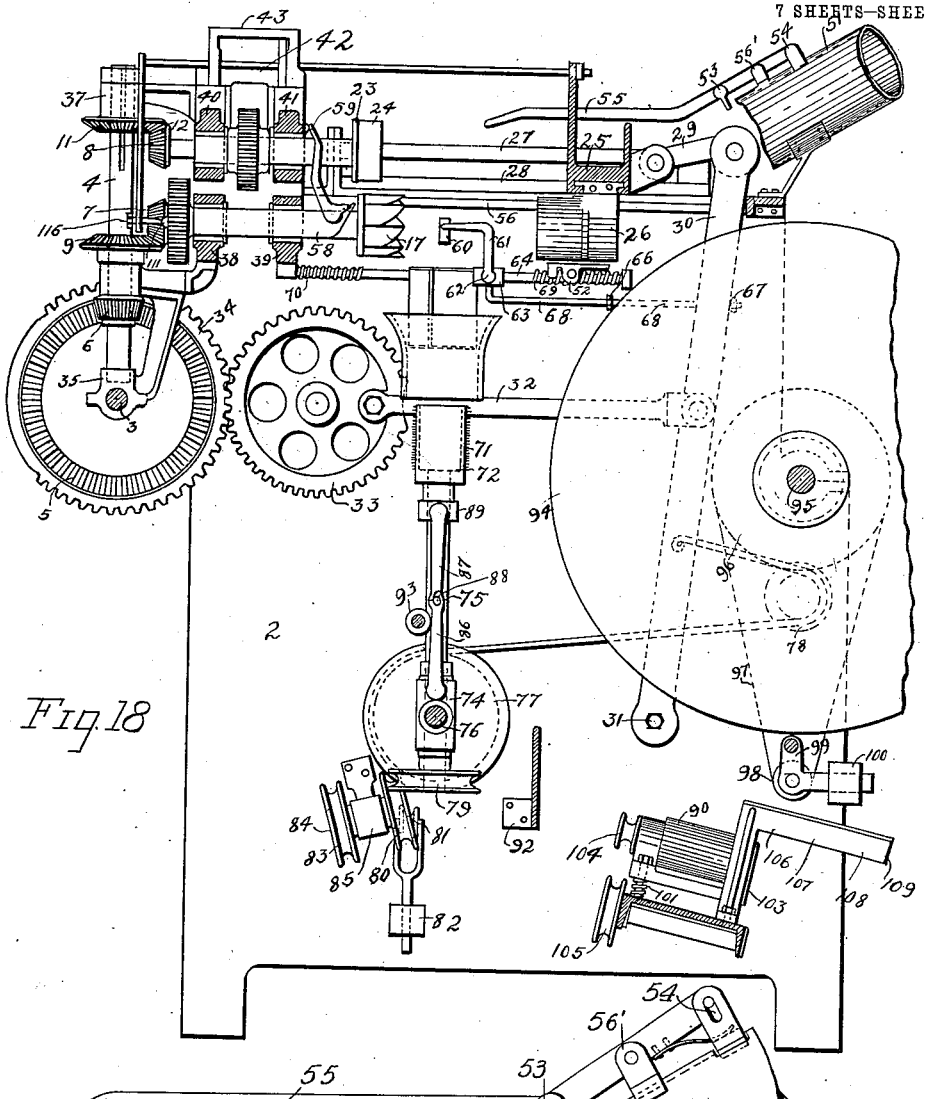
Figure 17:
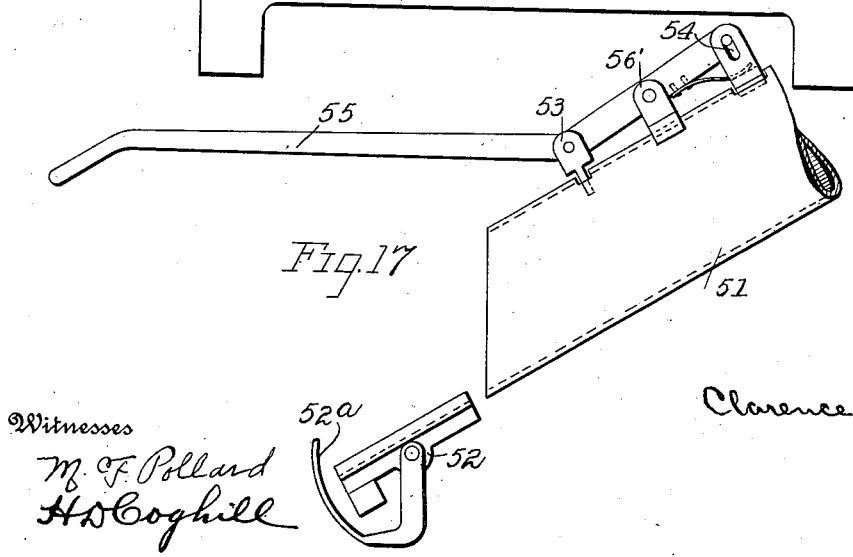

In the accompanying drawings, Figure 1 is an end elevation of the machine, partly in vertical section. Fig. 2 is a rear elevation, partly broken away. Fig. 3 is a top plan view partly broken away. Fig. 4 is a detail in vertical section showing a cutter head and shears. Fig. 5 is a detail in longitudinal section of the cutter head and the resilient rollers coöperating therewith. Fig. 6 is a cross section of the resilient rollers. Fig. 7 is a detail showing the means for lifting the rails which support the resilient rollers. Fig. 8 is a top plan view, in detail, showing devices for holding a can while it is being operated upon by the cutter head and shears, and for feeding and removing the cans therefrom. Fig. 9 is a side elevation of the parts shown in Fig. 8. Figs. 10 and 11 are opposite end views thereof, partly in section. Fig. 12 is a side elevation, showing forming and cleaning rollers, and a delivery device therefrom. Fig. 13 is a front view of the parts shown in Fig. 12. Fig. 14 is a detail in perspective view of a knuckle. Fig. 15 is a detail in end view of one of the delivery tracks. Figs. 16 and 17 are details in plan and side elevation of the feeding devices for feeding the cans to the machine. Fig. 18 is a side elevation similar to Fig. 1, with parts in different position.

Referring specifically to the drawings, 2 is a suitable frame for supporting the various parts of the machine to be hereinafter described.

3 is a main driving shaft which is driven by any suitable means.

4 is a vertical shaft mounted in bearings 35, 36 and 37 on the frame of the machine and driven by bevel gears 5 and 6 from the shaft 3. This shaft 4 operates the shafts 7' and 8' which drive shafts 7 and 8 extending horizontally one above the other, the former carrying cutter heads and one shear member, and the latter carrying resilient rollers and the other shear members. It may be explained that several of these pairs of shafts 7 and 8 will be provided, according to the size of the machine or the capacity desired, but each pair performs its functions independently of the others. The shaft 7' is driven by bevel pinions 9 and 10 from the shaft 4, and the shaft 8' is driven by bevel pinions 11 and 12 from the same shaft. The pinion 11 and bearing 37 are slidable up and down on the shaft 4, the pinion 11 having a suitable key fitting in a key-way in the shaft to permit this motion. From the first shaft 7' motion is communicated to the shafts 7 by spur gearing 13, 14, 15 and 16, and from the first shaft 8' the shafts 8 are driven by spur gears 19 and 20, 21, 22 etc., these pairs of shafts being arranged in horizontal alinement or gangs at the top of the frame.

Each shaft carries at its end a set of beveled knives 17, forming a cutter head which serves to cut out the heads of the cans which are fed thereto, the cans being forced over the cutter head for this purpose, and behind the cutter head, said shaft also carries a rotary shear member 18. Each shaft 8 carries at its end a resilient head or roll 24, which acts to turn the can on the cutter head in the same direction as that of the rotation of the cutter head, and said shaft also carries a shear member 23, which coöperates with the shear member 18, to cut off the top seam or corner of the can.

The various shafts 8 are mounted in bearings in rails 40 and 41 which extend across the top of the machine and which are connected at each end to a yoke or casting 42 which slides up and down in guides 43, and by means of which the rails 40 and 41 are raised and lowered to open and close the rotary shears and to open and close the head 24 with respect to the cutter head. When the cans are fed onto the cutter heads the rolls 24 must lift to allow the cans to enter between said rolls and the cutter heads, and the rolls are then lowered to shear off the top corners of the cans, the rolls 24 acting also to straighten the can body or press out dents therein as said can bodies are rotated. There is a yoke at each end of the machine, to carry the opposite ends of the rails 40 and 41, and each yoke is lifted in time by means of an eccentric 45 mounted on a shaft 50 and connected to the yoke 42 by means of an eccentric strap and rod 44, as shown in Fig. 7, the shaft 50 being supported in bearings 48 and 49 and driven by bevel gears 46 and 47 from the shaft 3.

25 is a cross-head or bar which carries grabs 26 which feed the cans to the cutter heads. This cross bar slides back and forth in guides 27 and 28 on the end frames of the machine, and it is connected by link 29 to lever 30 which is pivoted at 31 to the end frame.

32 is a connecting rod which connects the lever 30 to a crank wheel 33 which comprises an interrupted spur gear to give an intermittent or stop motion. The gear 33 meshes with a multilated gear 34, mounted on shaft 3. The gear 33 has a blank concave, and the gear 34 has a longer blank convex, and when the gears are rotated the motion stops at the blanks and is picked up when the teeth reëngage. The result of this is to give the lever 30 and cross head 25 a forward movement, a stop, a backward movement, and a forward movement again, the cutting action of the shears 18 and 23 occurring during the stop at the end of the forward movement, and the cans being fed to the grabs 26 at the commencement of the forward movement. The shafts 7 are supported by fixed cross-rails 38 and 39.

The up and down movements of the rails 40 and 41 and the shafts 8 carried thereby are necessarily intermittent or provided with a pause, in order that the shear 23 may remain in its lowered position long enough to cut the can, and therefore the bevel gear 46 is divided into four parts with blanks between, and the gear 47 is divided into two parts with blanks between, thus rotating the shaft 50 intermittently and causing a pause in the action of the eccentric 45 at the limit of its lower movement, said pause being sufficiently long for the shears to operate.

51 is a feed tube or magazine into which the cans are placed, heads down, one tube being provided for each set of cutters, and from each tube the cans are delivered one by one to a balancing table 52, said table being so pivoted that when the cans are delivered thereon, the weight of the rear end of the can will cause the table to turn to a horizontal position, and from which table the cans are picked up by the grab 26. The discharge of the cans from the tube 51 is controlled by a gate or stop 53 which works through a slot in the tube, and which lifts to allow one can to pass at a time; at the same time the shoe 54 binds and holds the next can in the tube. The gate 53 and the shoe are connected to a lever 55 which is pivoted at 56' and which is raised and lowered by sliding over a rib on the cross-head 25, as shown in Fig. 1. A stop 52$^a$ limits the movement of the cans as they reach the table 52.

Each grab 26 consists of two semi-circular parts, (see Figs. 8, 9 and 10) adapted to embrace a can therebetween, said parts being carried in slide-ways 25$^a$ on the under side of the cross head 25, being normally drawn together by a spring 26$^a$. The grab sections have a slight inwardly projecting rim 26$^b$ at the back end, to prevent the can from slipping out under the pressure of the cutter head 17. Each section of the grab has at the side thereof a dependent stud 26$^c$ projecting into a groove 56$^a$ in a guide piece 56, located and supported by the frame of the machine beside the line of travel of the grab. The front end of the groove 56$^a$ is curved outwardly as indicated at 56$^b$ and provided with a spring switch 57, which will open to let the stud 26$^c$ pass. As the cross head 25 advances the grabs toward the cutter heads, each stud 26$^c$ travels in its proper groove 56$^a$ until it strikes the can edge or bend 56$^b$, which acts to open the grab, and the switch 57 opens to allow the stud 26$^c$ to pass, and then closes. On the return slide the stud 26$^c$ passes outside of the rib 56$^c$ until the opposite end of the guide is reached, when the spring 26ª draws the sections of the grab together. The guide is so constructed that the jaws of the grab close on a can resting on the table 52, and then advance and hold the can while the cutter 17 enters therein and cuts out the head of the can, and then the jaws open and the grab retracts, after which the shears 18 and 23 act to shear off the corner or seam at the front end of the can.

It will be understood that when the front end or seam of the can is cut off by the roller shears, the severed piece will be in the form of a ring, and in order to prevent the collection of these rings on shaft 7, it is necessary to cut or open the rings so that they may drop from the shaft. This is done by means of two small pairs of shears of the scissors type, located on opposite sides of the shaft behind the roller shear 18. One member of each pair of scissors shears is indicated at 58 and the other member at 59, the two blades of these shears being so disposed that they will receive therebetween the ring cut from the can, and the blade 59 has a long tail which projects upwardly in position to be struck by the rail 41 as it lifts, thereby turning the said blade so as to clip or cut through the ring, and the two pairs of such shears thereby cut out a section of the ring of greater length than the diameter of the shaft 7, so that the parts of the ring can free themselves and drop from the machine.

To eject the head of the can from the cutter head 17, after being cut out, I employ an ejector shown particularly in Figs. 4 and 5. This consists of a plunger 110 at the end of a rod 111, which is normally retracted by spring 112. At the proper time the plunger is moved forward by means of a lever 114 operated by a rod 113 which is pulled in one direction by the cross head 25 striking stop 113ª on said rod. At about the end of the backward slide of the cross head, and when said rod is pulled, the adjustable screw 116 carried by the lever 114 presses the rod 111 forwardly and ejects the can head from the cutter 17. The lever 114 is pivoted at 115 to a bracket on the frame.

The mechanism above described will feed a can to the grab 26, and by operation of the same, in connection with the cutter head 17 and the shears 18 and 23, will cut out the head of the can and also cut off the end, leaving the remainder or body of the can, which is the part to be saved for further use, on the cutter head when the grab is retracted. The can body is then delivered to the cleaning devices by the following means: 60 indicates a pair of swiveling clamps or holders which are located on opposite sides of the shear 18, in such position that when the can is forced onto the cutter head 17 it will pass inside of or between the holders. These holders are provided with rollers 60ª, for the purpose of permitting the can to spin around therebetween without friction, as it is rotated by the shears. After the grab 26 opens and recedes, the can body is left hung or suspended between said holders, which are swiveled at 60ᵇ into bearing blocks at the ends of angular arms 61 which are carried by rod 62 extending across under the cutter head 17. The holders 60 are controlled to open and close slightly by means of springs 60ᶜ which tend to close them, and guides 65, secured to the lower side of the guide piece 56, and shaped at opposite ends to retract or open the holders by contact of a roller 60ᵈ which is attached to the pivot pin 60ᵇ and travels along the guide. The rod 62 is connected at each end to a block 63 which slides on a rod 64, and thereby carries the holders 60 back and forth in a horizontal direction. This back and forth motion is produced by the lever 30 contacting with a stop 66 for forward motion and stop 67 for backward motion, said stops being mounted on a rod 68 connected to the block 63. Springs 69 and 70 are compressed at the ends of the respective strokes and start the back and forth movements.

As stated, the can body is left between the holders 60 when the grab is retracted and said holders are arranged to engage the can near the rear end thereof so that there is considerable excess of weight in front of the pivots 60ᵇ of the holders. Following the retraction of the grabs, the holders are retracted or moved backward by the spring 70 and by the lever 30 striking the stop 67, the holders 60 binding against the can by the action of the springs 60ᶜ, and the travel of the rollers 60ᵈ to the low part of the guides 65, and thereby the can body is backed off of the cutter head 17, the rotary shears being first opened by the means above described, to release the can therefrom. After the can is cleared from the cutter head 17, this excess of weight forward of the pivots 60ᵇ causes the holders to turn on said pivots, permitting the can to hang with its front or open end downwardly, and at the limit of the backward movement the rollers 60ᵈ running up the high point of the guides 65 cause the holders to open, thereby allowing the can to drop onto the rotary brush 71, which at that instant is in vertical position, as shown in Fig. 18, ready to receive it. This rotary brush 71 consists of a shell provided on its exterior with bristles, felt or some other kind of cleaning material, and said brush rotates in the can dropped thereon. The shell 71 rotates on a shaft 75. This shaft 75 has a rotary motion, and also swings up and down on an axis formed by a rock shaft 76. The shaft 75 has its bearing in a block 74 mounted on the shaft 76 which rocks in bearings at 76ᵃ in the end plates of the frame 2. This rocking movement of the shaft 76 is produced by a flexible cable 77ᵃ, attached at one end to a wheel 77 on the shaft 76 and at the other end to the lever 30, passing intermediately over a reversing pulley 78 mounted on the frame. When the lever 30 is swung forwardly, the shaft 76 is turned and the shaft 75 carried thereby swings down. When the lever 30 swings backwardly the tension of the cable 77ᵃ is released, and the shaft 76 is rocked in the opposite direction, and the shaft 75 swings to vertical position, by means of a belt 79ᵃ which passes over pulley 79 mounted on the end of the shaft 75, said belt passing also over pulleys 80 and thence under a pulley 81 which is hung on the lower run of the belt and has a weight 82 attached thereto, which weight thus acts through the belt to pull down on the pulley 79 and swing the shaft 75 upwardly when the lever 30 swings backwardly. The pulley 80 is mounted on a shaft 84 supported in a bearing 85 attached to the frame and is driven from a pulley 83ᵃ on the main shaft 3 by means of a connecting belt 83ᵇ. When the shaft 75 is swung to vertical position the belt 80ᵃ runs idle, but when in consequence of the forward movement of the lever 30 the shaft 75 is swung down on its axis 76, the pulley 79 picks up the belt which thus becomes a driver to turn the pulley 79 and shaft 75, and as the slack in the belt is taken up the weight 82 is elevated, and acts to return the shaft 75 to upper position as soon as the tension on the cable 77ᵃ is released.

The brush shell 71 is slidable lengthwise on the shaft 75, and when the shaft is in vertical position said brush is advanced over the roll 72, and when said shaft is swung down the shell 71 is retracted from the roll 72, as shown in Fig. 1. This action is effected by means of toggles consisting of arms 86 and 87 connected by knuckle pin 88. The arm 87 is pivoted to a collar 89 attached to the shell 71, and the arm 86 is pivoted to the bearing block 74, with a spring 91 connecting the collar and the block, and tending to flex the toggle, and also to lock the toggle when it is straightened, the knuckle joint having stops as shown in Fig. 14 which in consequence of the tension of the spring lock the toggle when it is straightened, as shown in Fig. 18. When the shaft 75 swings up each toggle arm 86 strikes a roller 93 on a cross shaft 93ᵃ which straightens the toggle and advances the shell 71 over the roll 72. When the shaft 75 swings down to horizontal position the arm 87 strikes a stop 92 which breaks the toggle, allowing the spring 91 to contract and withdraw the shell 71 from the roll 72 and thereby withdrawing the roll 71 from the can body which remains on the said roll 72.

As the shaft 75 swings down from vertical to horizontal position the cleaning shell 71 is inside the can body, and during said swing said body is carried between cleaning disks 94 working in pairs on a cross shaft 95. These disks are located a proper distance apart to allow the cans to pass therebetween, and the inside surfaces of the disks are provided with bristles or polishing felts to clean the outside of the can. The respective disks rotate in opposite directions. Between each pair of disks is a roller 96 around which travels a cleaning or polishing belt 97, which also passes around a pulley 98 supported by a swinging hanger 99 provided with a weight 100 which tends to swing the belt inwardly to press the same against the bottom or end of the can body on the roll 72, thereby cleaning or polishing said end as it passes between the disks 94, the weight 100 providing a yielding pressure to hold the belt against the end of the can, which also serves to keep the can in position on the roll 72. One disk 94 is fast to shaft 95 and the other is loose thereon and is driven by a belt 94ᵃ which passes around a pulley 94ᵇ fastened to the loose disk 94 and around a pulley 94ᶜ on the shaft 3. A coiled spring 94ᵈ presses the loose disk 94 with a yielding pressure toward its mate.

90 is a straightening roll, to assist in pressing out dents in the cans after they are cleaned. It is carried in a bearing frame 102 and 103 which is slidable up and down in a housing 103ᵃ, being pressed behind a spring 101. This roll 90 coöperates with the roll 72 when the latter is swung down, the shell of the can body being pressed and rotated between said rolls. The roll 90 is driven by a belt 104ᵃ which extends around a pulley on the shaft 95 and around a pulley 104 on the spindle of the roll and a pulley 105 supported on a part of the frame.

At the limit of its downward swing the shaft 75 is inclined, and reaches a position with the roll 72 in line with a delivery chute or runway, and when the can reaches said position at the upper end of the runway it leaves the roll 72 and travels by gravity down the runway 106, which has a line of balls 106ᵃ on each side to decrease the friction. This runway has a series of steps or increases in width, for the purpose of separating the various sizes of cans. Thus the smallest size after leaving the head 72 will drop between the rails of the runway at 107, the next largest size will drop between the parts 108, and the largest at 109, and suitable chutes or conveying devices may be placed under the respective sections to carry off the can bodies.

It is thought that the operation of the machine will be evident from the above description, but it will be briefly stated as follows: The cans are supplied one by one from the chute 51 to the tilting table 52 from which each can is picked up by the grab or carrier 26 and by operation of the lever 30 and cross head 25 the grab is advanced and the can carried thereby to the cutter head 17 which cuts out the top of the can. The advance of the can also carries it between the rotary shears 18 and 23, the latter being lifted to permit the front end of the can to enter therebetween. The shear 23 is then lowered by means of the eccentric 45 connected by the yoke 42 to the rails 40 and 41 which carry the shaft of the shear 23. Said shears 18 and 23 cut off the front corner or seam of the can body in the form of a ring, which is clipped in two places by the shears 58 and 59, the latter being operated by the lift of the rail 41. The severed ring is thus opened to allow it to clear itself from the shaft 7. The grab 26 then opens and retracts, leaving the can suspended between the holders 60 which are then retracted by the backward swing of the lever 30 and the action of the spring 70, the can body being thus backed off of the cutter head 17, and after it clears said cutter head it tilts on the pivots of the holders 60 so that its open end is down, directly over the roll 72 and shell 71 which are at that time in vertical position ready to receive it. The holders 60 then open, allowing the body to drop on the shell 71. The shaft 75 then swings down carrying the can between the cleaning disks 94 which rotate and clean the outside of the can as it swings down therebetween, the brush 71, and the brush 73 at the end of the roll 72 acting to clean the inside of the shell and bottom of the can, and the cleaning belt 97 acting to clean the outside of the bottom of the can. When the shaft 75 swings down to lowest position the toggle 86, 87 is flexed and the spring 91 withdraws the shell 71 from the can, which is then pressed between the rolls 72 and 90 to press out any dents, the can being rotated during said cleaning operations, and finally spinning or dropping off of the roll 72, in consequence of gravity, onto the runway 106 whence it is delivered. The same operation is then repeated for the next action, the shaft 75 swinging up to vertical position in due time. The head which was cut out by the cutter 17 is ejected therefrom by the plunger 110 which is advanced as the cross head 25 retracts.

Having thus described my invention, what I claim as new and desire to secure by Letters Patent is:—

1. In a machine for treating old cans or the like, the combination with a reciprocating can carrier adapted to advance a can endwise, of a cutter head the cutter of which is presented endwise and located in the line of travel of the carrier and adapted to cut out the head of a can so advanced.

2. In a machine for treating old cans or the like, the combination with a reciprocating can carrier adapted to advance a can endwise, of a cutter head the cutter of which is presented endwise and located in the line of travel of the carrier and adapted to cut out the head of a can so advanced, and means to retract the can body from the cutter head after the end is cut out.

3. In a machine for treating old cans or the like, the combination of a reciprocating can carrier adapted to advance a can endwise, a cutter head located in the line of travel of the carrier and adapted to cut out the end of a can so advanced, and shears located behind the cutter head and arranged to cut off the end of the can body.

4. In a machine for treating old cans or the like, the combination of a reciprocating can carrier adapted to advance a can endwise, a cutter head located in the line of the travel of the carrier and adapted to cut out the end of a can so advanced, and a pair of rotary shears located behind the cutter head and arranged to cut off the end of the can body.

5. In a machine for treating old cans or the like, the combination with a traveling can carrier adapted to advance a can endwise, a rotary cutter head located in the line of travel of the carrier and adapted to cut out the end of a can so advanced, a pair of rotary shears one member of which is located behind the cutter head in position to enter the can and the other member of which is arranged to cut around the outside of the can, and means to move the latter member laterally to permit the can body to enter between the shear members.

6. In a machine for treating old cans or the like, the combination with a traveling can carrier adapted to advance a can endwise, a shaft and means to rotate the same, a cutter head and a shear member mounted on said shaft, the shear member being located behind the cutter head, another shaft and means to rotate the same, and another shear member carried by the last mentioned shaft and arranged to coöperate with the first mentioned shear member to cut off the end of a can body, and means to open the shear members to allow the can body to enter therebetween.

7. In a machine for treating old cans or the like, the combination of a pair of parallel shafts movable laterally toward and from each other, rotary shear members carried by the respective shafts, the lateral movement of the shafts acting to open and close the shear members, a reciprocating can carrier movable toward and from one of the shear members and adapted to place a can thereon when the shear members are open, said shear members acting to cut a ring from the end of the can, means to open said ring to permit it to clear itself, and means to retract the remainder of the can body from the shear member.

8. In a machine for treating old cans or the like, the combination with a feeding device and a cutting device, located in line with each other, of a reciprocating can carrier movable in a right line between said devices and adapted to carry a can from the former to the latter.

9. In a machine for treating old cans or the like, the combination of a rotary cutter head, a feed chute, the mouth of the chute being presented toward the end of the cutter head and a reciprocating can carrier movable in a right line between the chute and the cutter head.

10. In a machine for treating old cans or the like, the combination of a rotary cutter head, a pair of rotary shears one member of which is located behind and rotates with the cutter head, said cutter head being adapted to cut out the end of a can, and said shears being adapted to cut a ring from the end of the can, a pair of shears located at opposite sides of said rotary shears, in position to receive said ring, means to operate the various shears, and means to feed a can onto the cutter head and between the rotary shears.

11. In a machine for treating old cans or the like, the combination with a rotary cutter head, of a can carrier for feeding cans thereto, said carrier comprising a pair of curved jaws arranged to embrace the can therebetween, a reciprocating cross head on which said jaws have lateral movement, and means to open and close the jaws.

12. In a machine for treating old cans or the like, the combination of a rotary cutter head, and a can carrier movable in axial alinement therewith, said carrier comprising a pair of opposite jaws between which the can is gripped, said jaws being located to pass on opposite sides of the head, a reciprocating cross head on which the jaws are carried, and means to open and close the jaws.

13. In a machine for treating old cans or the like, the combination of a rotary cutter head, and a can carrier movable in axial alinement therewith, said carrier comprising a pair of opposite jaws between which the can is gripped, said jaws being located to pass on opposite sides of the head, a reciprocating cross head on which the jaws are carried, and means to open and close the jaws, said means comprising guide tracks, and the respective jaws having projections which follow said tracks.

14. In a machine for treating old cans or the like, the combination of a rotary cutter, a can carrier movable in axial alinement therewith and comprising opposite jaws and a spring connecting said jaws and tending to close the same to grip a can therebetween, said jaws having projections, a cross head on which the jaws are mounted, and guide tracks located on opposite sides of the line of travel of the carrier, said projections engaging in said tracks, and the latter being shaped to open and close the jaws substantially as described.

15. In a machine for treating old cans or the like, the combination of a cutter, a reciprocating can carrier adapted to advance cans to the cutter, a cross head to which the carrier is attached, a chute for feeding the cans to the carrier, a gate device in the chute to feed the cans one at a time, and means actuated by the cross head to operate the gate device.

16. In a machine for treating old cans or the like, the combination of a cutter, a reciprocating cross head, a can carrier mounted on the cross head and movable to and from the cutter to feed cans thereto, a lever connected to the cross head, and means to vibrate the lever intermittently, substantially as described.

17. In a machine for treating old cans or the like, the combination of a rotary cutter head, a pair of rotary shears behind the cutter head, means to open and close said shears, and means to advance a can onto the cutter head and between said shears, the cutter head being adapted to cut out the end of a can and the shears being adapted to cut off the end of the can body, and means to retract a can from the cutter head and shears after said cutting operations.

18. In a machine for treating old cans or the like, the combination of a rotary cutter head, a pair of rotary shears behind the cutter head, means to open and close said shears, and means to advance a can onto the cutter head and between said shears, the cutter head being adapted to cut out the end of a can and the shears being adapted to cut off the end of the can body, and means to retract a can from the cutter head and shears after said cutting operations said means comprising a pair of pivoted holders located respectively at opposite sides of the cutter head, means to advance and retract the holders and means to open and close the holders.

19. In a machine for treating old cans or the like, the combination of a rotary cutter head, a pair of rotary shears behind the cutter head, means to open and close said shears, and means to advance a can onto the cutter head and between said shears, the cutter head being adapted to cut out the end of a can and the shears being adapted to cut off the end of the can body, and means to retract a can from the cutter head and shears after said cutting operations, said means comprising a pair of pivoted holders located respectively at opposite sides of the cutter head, means to advance and retract the holders, and means to open and close the holders, each of said holders having antifriction rollers on the inner side thereof, to permit the can to rotate therebetween.

20. In a machine for treating old cans or the like, the combination of a reciprocating cross head, a can carrier depending therefrom, a rotary cutter head located in the line of movement of the carrier and adapted to cut out the head of a can in the carrier, a pair of shears behind the cutter head adapted to cut off the end of the can, a pair of holders located at opposite sides of one of the shear members and cutter head, a slide on which the holders are mounted, means to open and close the holders, and means to advance and retract the slide in a line parallel to the axis of the cutter head.

21. In a machine for treating old cans or the like, the combination with a cutter adapted to cut off the end of a can, and can cleaning devices, of a can holder adapted to hold a can while it is being acted on by said devices, and means to transfer a can from the cutter to said holder.

22. In a machine for treating old cans or the like, the combination of a can cutting device, a can cleaning device, and means to transfer a can from the cutting device to the cleaning device, said means including can holders movable to and from the cutter and a swinging shaft operating between the holders and the cleaning device and adapted to receive a can from the holders and carry the same to the cleaning device.

23. In a machine for treating old cans or the like, the combination with a cutter head, of a reciprocating can carrier movable to and from the same to advance a can onto the cutter whereby the latter may cut out the end of the can, means to retract the can body from the cutter head after the end is cut out, a plunger operating in the cutter head to eject the end of the can therefrom, and means to operate said plunger when the can body is retracted.

24. In a machine for treating old cans or the like, the combination with can cutting devices, can cleaning devices, and can forming devices, of means to transfer a can from the cutting devices through the cleaning devices and to the forming devices.

25. In a machine for treating old cans and the like, the combination of an inclined chute, a cutter, a can carrier reciprocating between the chute and cutter, and a tilting table located at the lower end of the chute and adapted to rock to horizontal position when a can is placed thereon, said table being located in the line of travel of the carrier, to deliver a can thereto.

26. In a cleaning machine, the combination of a pair of rotary cleaning disks standing vertically, a pivotally mounted shaft provided at its free end with a device to receive a can and carry the same between the disks, means to swing the shaft between the disks, a pulley on the shaft, and a weighted belt located in position to be picked up by the pulley as the shaft swings down between the disks.

In testimony whereof, I affix my signature in presence of two witnesses.

CLARENCE COSBY.

Witnesses:
M. F. POLLARD,
C. E. JOHNSEN.

---

Copies of this patent may be obtained for five cents each, by addressing the "Commissioner of Patents, Washington, D. C."